US012440997B2

(12) United States Patent
Farrow et al.

(10) Patent No.: US 12,440,997 B2
(45) Date of Patent: Oct. 14, 2025

(54) SYSTEMS AND METHODS FOR ASSEMBLING PATTERNS AND CUTTING AND APPLYING WINDOW FILMS AND PAINT PROTECTION FILMS

(71) Applicant: Eastman Performance Films, LLC, St. Louis, MO (US)

(72) Inventors: James Yancy Farrow, St. Louis, MO (US); Catherine Delphine Williams, St. Louis, MO (US); Aaron Leslie Reeves, Hampshire (GB); Richard Anthony Dill, Penhook, VA (US); Darrell Lynn Reed, Chesterfield, MO (US); Bill Reimer, Clayton, MO (US); Jake Herberlie, Clayton, MO (US); James VanDernoot, Clayton, MO (US); Nick Mikulec, Clayton, MO (US); Jason Butler, Clayton, MO (US); Becky Gandillon, Clayton, MO (US)

(73) Assignee: Eastman Performance Films, LLC, St. Louis, RI (US)

( * ) Notice: Subject to any disclaimer, the term of this patent is extended or adjusted under 35 U.S.C. 154(b) by 838 days.

(21) Appl. No.: 17/595,940

(22) PCT Filed: Jun. 3, 2020

(86) PCT No.: PCT/US2020/035908
§ 371 (c)(1),
(2) Date: Nov. 30, 2021

(87) PCT Pub. No.: WO2020/247486
PCT Pub. Date: Dec. 10, 2020

(65) Prior Publication Data
US 2022/0227004 A1    Jul. 21, 2022

Related U.S. Application Data

(60) Provisional application No. 62/856,453, filed on Jun. 3, 2019.

(51) Int. Cl.
*B25J 11/00*    (2006.01)

(52) U.S. Cl.
CPC ........ *B25J 11/0055* (2013.01); *B25J 11/0075* (2013.01)

(58) Field of Classification Search
CPC . B25J 11/0055; B25J 11/0075; G06Q 10/043; G06Q 10/0633; B26D 5/00;
(Continued)

(56) References Cited

U.S. PATENT DOCUMENTS 4,551,810 A    11/1985  Levine
9,120,517 B2 *  9/2015  Salvaggio, Jr. .......... B62J 50/40
(Continued)

FOREIGN PATENT DOCUMENTS

CN    202 592 428 U    12/2012
CN    107848458 A     3/2018
(Continued)

OTHER PUBLICATIONS

Notification of Transmittal of The International Search Report and The Written Opinion of the International Searching Authority, or the Declaration with a mailing date of Sep. 2, 2020 for International Application No. PCT/US2020/035908.

*Primary Examiner* — Ghassem Alie
(74) *Attorney, Agent, or Firm* — Robert C. Morriss

(57) ABSTRACT

A method, software application, and system for assembling a pattern and cutting and applying a film to a vehicle, including: receiving a vehicle identification and obtaining the pattern associated with the received vehicle identification using pattern assembly instructions stored in a memory and executed by a processor; modifying the pattern using pattern modification instructions stored in the memory and executed by the processor; transmitting the pattern to a cutting machine, wherein the cutting machine is operable for
(Continued)

cutting the film according to the pattern; and transmitting installation instructions associated with the pattern to a mobile device that is adapted to be utilized by an installer/user and display the installation instructions proximate the vehicle.

19 Claims, 18 Drawing Sheets

(58) Field of Classification Search
CPC .... B26D 5/005; B26D 2005/002; B26D 3/08; B26D 3/085; G06F 3/02; B32B 7/06; B32B 7/12; G09F 2003/0222; G09F 2005/002; B26F 1/3813; Y10T 83/162; Y10T 156/1056
USPC ...... 83/72, 76.1; 296/136.07; 427/282, 42.1, 427/384
See application file for complete search history.

(56) References Cited

U.S. PATENT DOCUMENTS

| | | | |
|---|---|---|---|
| 2007/0240548 A1* | 10/2007 | Pape | B26D 5/00 83/76.1 |
| 2014/0292026 A1 | 10/2014 | Salvaggio, Jr. | |
| 2015/0066712 A1 | 3/2015 | Altieri | |
| 2017/0011498 A1* | 1/2017 | Yu | G06T 7/001 |
| 2019/0138861 A1 | 5/2019 | Lehrer et al. | |

FOREIGN PATENT DOCUMENTS

| | | | | |
|---|---|---|---|---|
| JP | 2006-079540 A | 3/2006 | | |
| JP | 2013-506226 A | 2/2013 | | |
| WO | WO-2015114767 A1 * | 8/2015 | | B26D 5/00 |
| WO | WO-2018207317 A1 * | 11/2018 | | G05B 19/4183 |
| WO | WO-2019027846 A1 * | 2/2019 | | B26D 3/08 |

* cited by examiner

+ ADD KIT

| Full Car Kit |
| 12 patterns, 12 Verified |
| Full Extended Coverage Kit |
| 9 patterns, 9 Verified |
| Full Standard Kit |
| 6 patterns, 6 Verified |
| Partial Standard Kit |
| 6 patterns, 6 Verified |

18a

+ ADD PART

| A-Pillar, Left |
| Verified |
| A-Pillar, Right |
| Verified |
| Bumper, Front |
| Verified |
| Bumper Deck |
| Verified |
| Door Cup, Front, Left |

FIG. 4

SYSTEMS AND METHODS FOR ASSEMBLING PATTERNS AND CUTTING AND APPLYING WINDOW FILMS AND PAINT PROTECTION FILMS

TECHNICAL FIELD

The present disclosure relates generally to the window film (WF) and paint protection film (PPF) fields. More particularly, the present disclosure relates to systems and methods for assembling patterns and cutting and applying WFs and PPFs. The present disclosure provides a software application including a mobile component that aides an installer in selecting, cutting, and properly applying WFs and PPFs.

BACKGROUND

It is becoming increasingly common for consumers to cover the window and paint surfaces of their vehicles, especially high-end and specialty vehicles, with WFs and PPFs. Such WFs and PPFs are typically cut from a film sheet using a pattern and then applied to the desired vehicle surfaces, enhancing or customizing their appearance and protecting them. Conventionally, the generation of such patterns has been manual and the number of and variety of patterns has been limited accordingly. Likewise, the cutting process has been manual or aided by only rudimentary software, providing limited user-friendliness, customizability, and subsequent application guidance. The patterning, cutting, and application processes are made more difficult by the sheer number of vehicles available to cover, the number of exterior components associated with each vehicle, and the difficulty in aligning each cover piece with the appropriate exterior component. Window and paint covering services are typically provided by dealerships and after-market shops and represent a large and growing market. Thus, it is imperative to expand pattern inventories and enhance accuracy and efficiency, primarily through the provision of a robust integrated software platform for use by installers.

The present background related to WFs and PPFs is provided as exemplary context only and it will be readily apparent to those of ordinary skill in the art that the concepts of the present disclosure may be applied equally in other contexts, without limitation.

SUMMARY

In various exemplary embodiments, the present disclosure provides a system, method, and software application including a mobile component that provide an installer, or more generally a user, with access to numerous WF and PPF cutting patterns, allow these cutting patterns to be viewed, manipulated, and customized as desired, and provide guidance, including via a mobile device, as to where and how the resulting cover pieces should be applied to the components of a vehicle.

The software application, embodied as a non-transitory computer-readable medium, and including the mobile component, optionally incorporates a mapping tool that allows WF and PPF cutting patterns to be obtained and stored and then cross-referenced between vehicles utilizing common components to create full patterns for more vehicles than is conventionally possible. The patterns and/or part data used to generate and associate the patterns are obtained from original equipment manufacturer (OEM) and third-party databases, as well as conventional and novel 3-D imaging and 2-D pattern generation techniques. This mapping tool is described in greater detail herein below.

The software application also optionally incorporates a cutting tool that allows for a given pattern to be selected, optimized with respect to a given area of film, customized to account for desired edge overlap and the like, and then cut. This cutting tool is described in greater detail herein below.

The software application further optionally incorporates automated decision-making algorithms and business logic that provide various selected information categories to be made visible to an installer/user, such as sensor locations, badge locations, tack order, etc. A conventional or exoskeleton view is optionally utilized that presents the various cover pieces and vehicle components in a logical relativistic configuration, making the proper alignment of each cover piece readily ascertainable, for example. This automated decision-making tool is described in greater detail herein below.

In general, the software application makes use of enhanced user interfaces, mobile device accessibility and display, and artificial intelligence (AI), by which the various processes are streamlined and tailored on an installer/user/vehicle basis. Thus, the software application provides superior database generation, operational efficiency, and installer/user experience.

In one exemplary embodiment, the present disclosure provides a method for assembling a pattern and cutting and applying a film to a vehicle, the method including: receiving a vehicle identification and obtaining the pattern associated with the received vehicle identification using pattern assembly instructions stored in a memory and executed by a processor; modifying the pattern using pattern modification instructions stored in the memory and executed by the processor; transmitting the pattern to a cutting machine, wherein the cutting machine is operable for cutting the film according to the pattern; and transmitting installation instructions associated with the pattern to a mobile device that is adapted to be utilized by an installer/user and display the installation instructions proximate the vehicle. Receiving the vehicle identification includes one of selecting the vehicle from a vehicle database and scanning a vehicle identification number of the vehicle using the mobile device. When executed by the processor, the pattern assembly instructions are operable for correlating common pattern parts between vehicles predetermined to be in a common vehicle family. When executed by the processor, the pattern modification instructions are operable for one or more of: reconfiguring a relative position of a part of the pattern; modifying a size of a part of the pattern based on a predetermined dimensional change in film associated with the part of the pattern during installation; adding one or more predetermined sensor cutouts to a part of the pattern; adding one or more predetermined badge cutouts to a part of the pattern; and adding one or more edge wrap extensions to a part of the pattern based on an indication of installer/user preferences. The installation instructions displayed on the mobile device include one or more tack points to be used by the installer/user when installing parts cut from the film according to the pattern are installed on the vehicle. The installation instructions displayed on the mobile device also include notes associated with one or more prior installations associated with the pattern. The installation instructions displayed on the mobile device further include one or more videos associated with the pattern. Optionally, the mobile device is operable for capturing an image of the vehicle over which the pattern is displayed in an augmented reality space.

In another exemplary embodiment, the present disclosure provides a non-transitory computer-readable medium stored as instructions in a memory and executed by a processor to perform steps for assembling a pattern and cutting and applying a film to a vehicle, the steps including: receiving a vehicle identification and obtaining the pattern associated with the received vehicle identification using pattern assembly instructions stored in the memory and executed by the processor; modifying the pattern using pattern modification instructions stored in the memory and executed by the processor; transmitting the pattern to a cutting machine, wherein the cutting machine is operable for cutting the film according to the pattern; and transmitting installation instructions associated with the pattern to a mobile device that is adapted to be utilized by an installer/user and display the installation instructions proximate the vehicle. Receiving the vehicle identification includes one of selecting the vehicle from a vehicle database and scanning a vehicle identification number of the vehicle using the mobile device. When executed by the processor, the pattern assembly instructions are operable for correlating common pattern parts between vehicles predetermined to be in a common vehicle family. When executed by the processor, the pattern modification instructions are operable for one or more of: reconfiguring a relative position of a part of the pattern; modifying a size of a part of the pattern based on a predetermined dimensional change in film associated with the part of the pattern during installation; adding one or more predetermined sensor cutouts to a part of the pattern; adding one or more predetermined badge cutouts to a part of the pattern; and adding one or more edge wrap extensions to a part of the pattern based on an indication of installer/user preferences. The installation instructions displayed on the mobile device include one or more tack points to be used by the installer/user when installing parts cut from the film according to the pattern are installed on the vehicle. The installation instructions displayed on the mobile device also include notes associated with one or more prior installations associated with the pattern. The installation instructions displayed on the mobile device further include one or more videos associated with the pattern. Optionally, the mobile device is operable for capturing an image of the vehicle over which the pattern is displayed in an augmented reality space.

In a further exemplary embodiment, the present disclosure provides a system for assembling a pattern and cutting and applying a film to a vehicle, the system including: a memory storing pattern assembly instructions executed by a processor to receive a vehicle identification and obtain the pattern associated with the received vehicle identification; the memory storing pattern modification instructions executed by the processor to modify the pattern; the memory storing pattern cutting instructions executed by the processor to transmit the pattern to a cutting machine, wherein the cutting machine is operable for cutting the film according to the pattern; and the memory storing installation instructions executed by the processor to transmit installer/user instructions associated with the pattern to a mobile device that is adapted to be utilized by an installer/user and display the installer/user instructions proximate the vehicle. When executed by the processor, the pattern modification instructions are operable for one or more of: reconfiguring a relative position of a part of the pattern; modifying a size of a part of the pattern based on a predetermined dimensional change in film associated with the part of the pattern during installation; adding one or more predetermined sensor cutouts to a part of the pattern; adding one or more predetermined badge cutouts to a part of the pattern; and adding one or more edge wrap extensions to a part of the pattern based on an indication of installer/user preferences. The installer/user instructions displayed on the mobile device include one or more tack points to be used by the installer/user when installing parts cut from the film according to the pattern are installed on the vehicle.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a kit selection screen utilized in accordance with the process of FIG. 1;

FIG. 17 is a block diagram of a server which may be used in the cloud-based system of FIG. 16 or the like; and FIG. 18 is a block diagram of a user device which may be used in the cloud-based system of FIG. 16 or the like.

DESCRIPTION OF EMBODIMENTS

Figure 1:
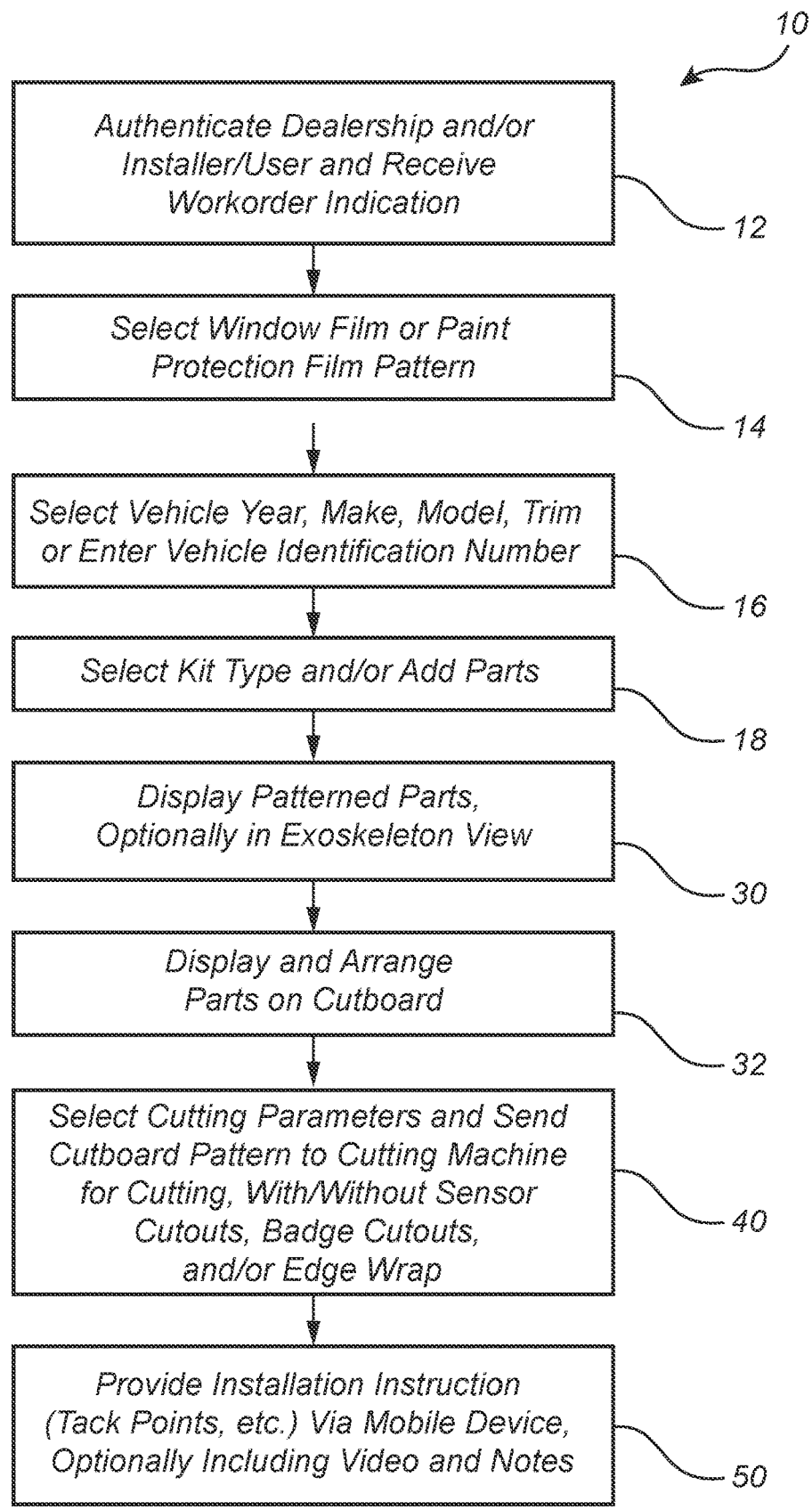
FIG. 1 is a flowchart illustrating the functional process flow of the software application of the present disclosure.

Again, the present disclosure provides a system, method, and software application including a mobile component that provide an installer, or more generally a user, with access to numerous WF and PPF cutting patterns, allow these cutting patterns to be viewed, manipulated, and customized as desired, and provide guidance, including via a mobile device, as to where and how the resulting cover pieces should be applied to the components of a vehicle.

The software application, embodied as a non-transitory computer-readable medium, and including the mobile component, optionally incorporates a mapping tool that allows WF and PPF cutting patterns to be obtained and stored and then cross-referenced between vehicles utilizing common components to create full patterns for more vehicles than is conventionally possible. The patterns are obtained from part data obtained from OEM and third-party databases, as well as conventional and novel 3-D imaging and 2-D pattern generation techniques. This mapping tool is described in greater detail herein below.

The software application also optionally incorporates a cutting tool that allows for a given pattern to be selected, optimized with respect to a given area of film, customized to account for desired edge overlap and the like, resized according to installer preference, and then cut. This cutting tool is described in greater detail herein below.

The software application further optionally incorporates automated decision-making algorithms and business logic that provide various selected information categories to be made visible to an installer/user, such as sensor locations, badge locations, tack order, etc. An exoskeleton view is optionally utilized that presents the various cover pieces and vehicle components in a logical relativistic configuration, making the proper alignment of each cover piece readily ascertainable, for example. This automated decision-making tool is described in greater detail herein below.

In general, the software application makes use of enhanced user interfaces, mobile device accessibility and display, and AI, by which the various processes are streamlined and tailored on an installer/user/vehicle basis. Thus, the software application provides superior database generation, operational efficiency, and installer/user experience.

In various exemplary embodiments, in general, the software application of the present disclosure includes a mapping tool, a cutting tool, and an automated decision-making tool. These tools, realized as interoperative software modules, are operable for accomplishing functional tasks including, but not limited to, for example: registering a new dealership, editing a dealership profile, authorizing a new installer/user, managing passwords and permissions, selecting a new vehicle, vehicle identification number (VIN) entry, pattern/kit access and assembly, pattern feedback, notes generation, dealership job workflow, pattern/kit customization, film roll selection and layout, component selection, cutting alignment and layout, group/ungroup functionality, manual and automatic nesting, edge wrapping, sensor location, tack point location and order indication, reset and warning functionality, save and favorite functionalities, virtual instruction functionality, warranty issuance, physical film lot identification (ID) tied to installed vehicle, mobile functionality, performance metrics and data analytics, administrative setup, installer/user setup, cloud functionality, container management, encryption, security logging, language, system and application logs, data replication and storage, system security, etc. The present disclosure first provides details of some tools that may be used across embodiments thereof, then provides software operability and installer/user interaction examples, and finally provides software architecture and environment examples.

Figure 2:
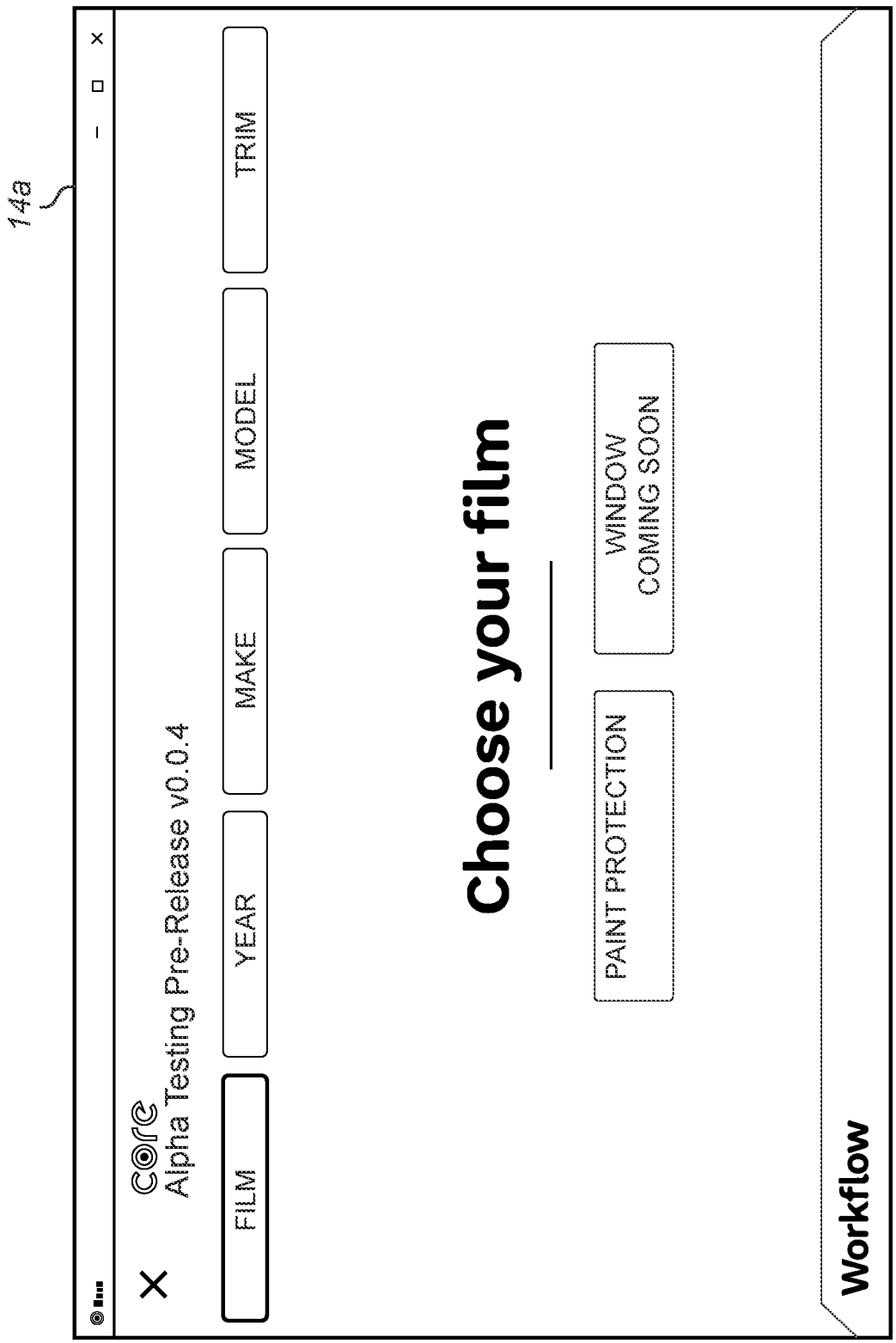
FIG. 2 is a WF or PPF pattern generation selection screen utilized in accordance with the process of FIG. 1.
Figure 3:
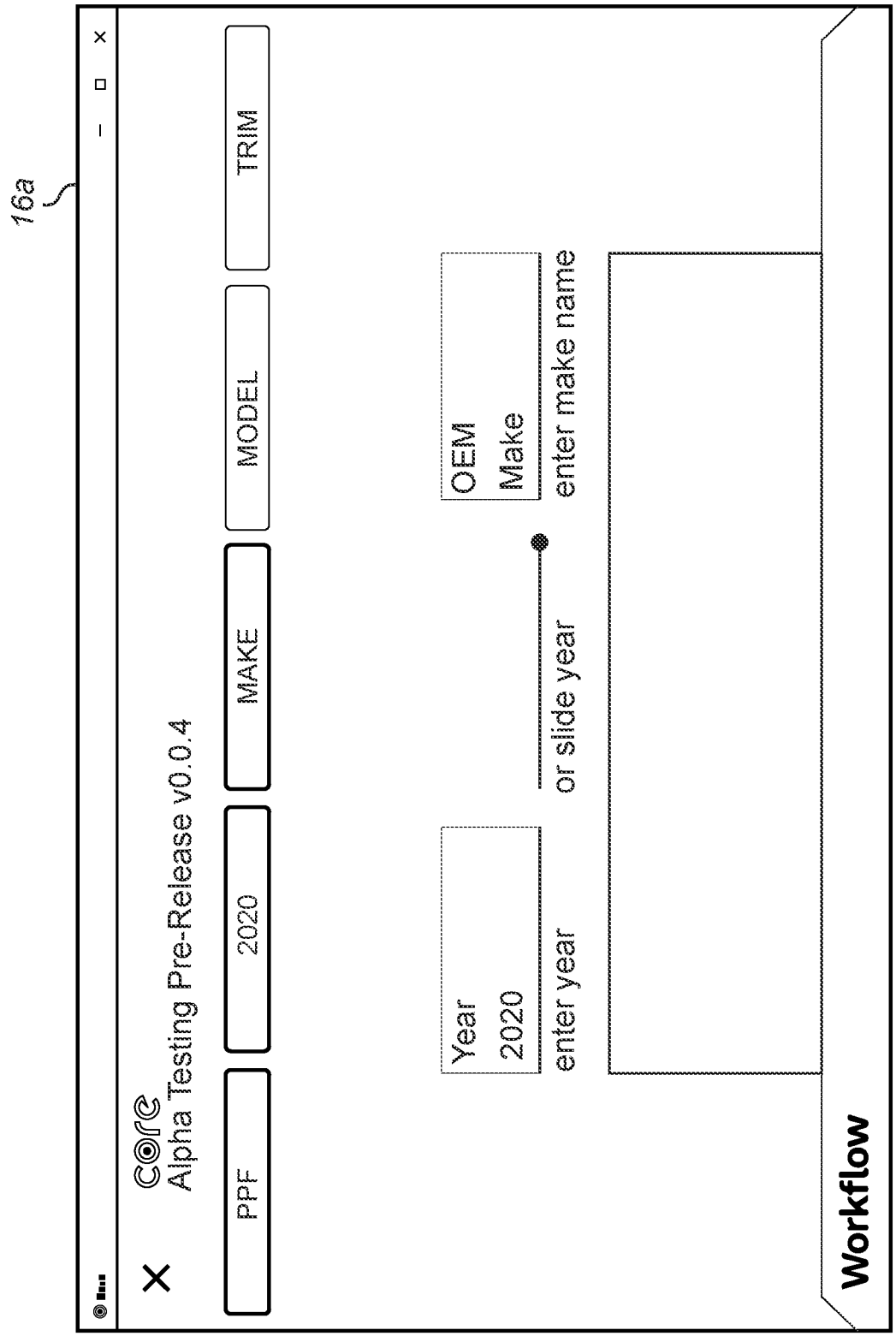
FIG. 3 is a vehicle selection screen utilized in accordance with the process of FIG. 1.

FIG. 1 is a flowchart illustrating the functional process flow 10 of the software application of the present disclosure. The process 10 begins with authenticating a dealership and/or installer/user and, optionally, receiving a workorder indication 12. This authentication process can be via stored password, biometric authentication, or the like. Next, WF or PPF pattern generation is selected 14. The related WF or PPF pattern generation selection screen 14a is shown in FIG. 2. It will be readily apparent to those or ordinary skill in the art that other types of films could also be patterned, cut, and applied using this process 10. Next, the vehicle (or other substrate) for which a WF or PPF pattern is to be generated/obtained is identified by the selection of year, make, and model or the entry of a VIN 16. The related vehicle selection screen 16a is shown in FIG. 3. Subsequently, available trim packages can also be displayed and selected, if not already specified by the VIN, for example. Then, the installer/user has the option of selecting a full vehicle pattern, an extended vehicle pattern, a partial vehicle pattern, etc., and adding or subtracting individual parts to cover 18. The related kit selection screen 18a is shown in FIG. 4. An indication is provided as to how many parts are associated with each kit and whether or not the associated patterns are "verified."

Figure 5:
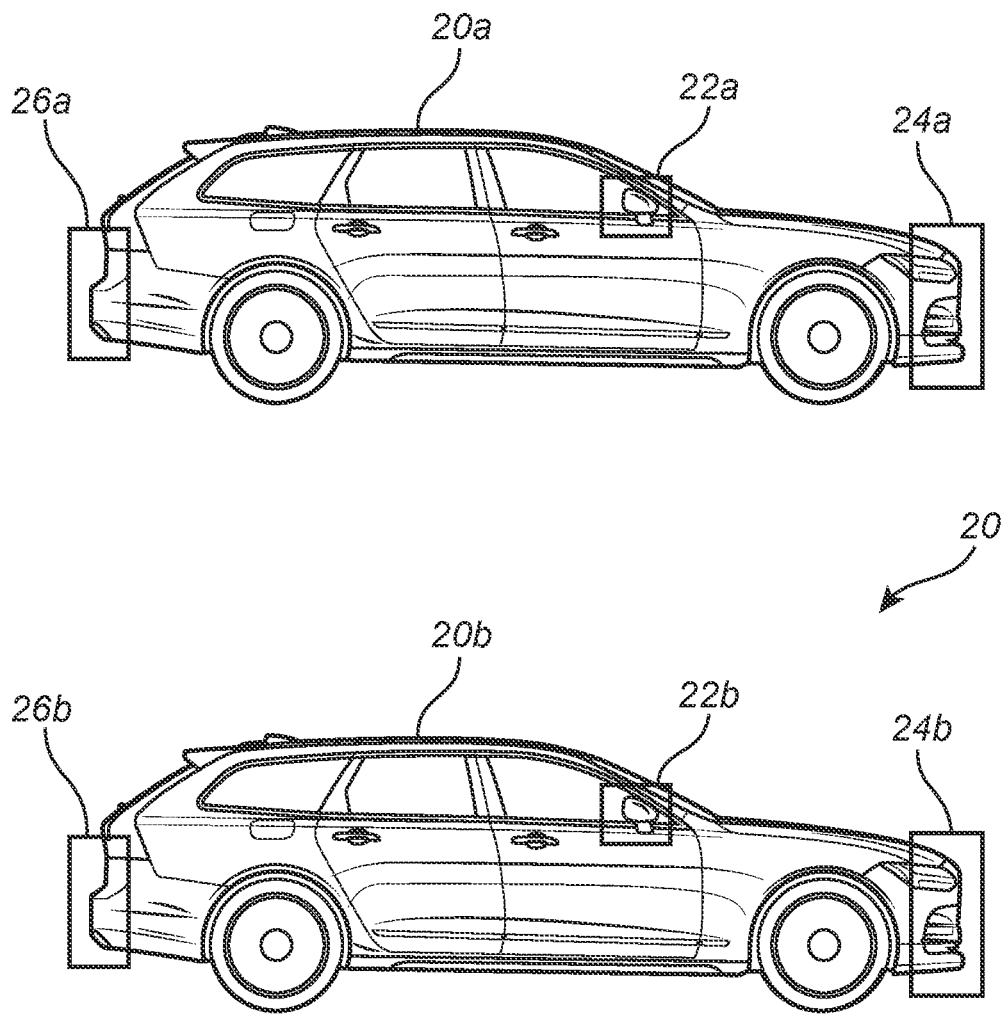
FIG. 5 is a schematic diagram illustrating the operational principles of one exemplary embodiment of the mapping functionality and module of the software application of the present disclosure.

FIG. 5 is a schematic diagram illustrating the operational principles of one exemplary embodiment of the basic mapping functionality and module of the software application of the present disclosure. The mapping functionality allows for the identification of common components across multiple vehicles (e.g., across multiple years, models, or trims for a single manufacturer or related manufacturers). Thus, even if a given pattern is not available for a specific vehicle, the mapping may be in place to obtain the requested pattern(s) from another vehicle sharing predetermined commonalities, either in advance or on demand. This cross-correlation allows complete patterns to be more rapidly developed for more vehicles. Each vehicle is not viewed on an individual basis, but rather families sharing common parts are the focus. As illustrated, two vehicles 20a and 20b are provided, which are of the same make, model, and year, but with different basic trim packages. As a result, all exterior components are the same, except for the mirrors 22a and 22b, front fender packages 24a and 24b, and rear fender packages 26a and 26b. Thus, different PPF patterns are required for the mirrors 22a and 22b, front fender packages 24a and 24b, and rear fender packages 26a and 26b, with all other PPF patterns being the same. The mapping tool or module is integrated with the appropriate part repositories accordingly and partial or complete PPF patterns may be rapidly generated for the two similar vehicles 20a and 20b utilizing one or more stored maps. In the pattern cataloging process, any missing PPF patterns for a vehicle family 20 are prioritized by a pattern generation prioritization algorithm, such that all possible PPF patterns may be rapidly acquired when requested. When a given part on a vehicle 20a or 20b is changed, an impact analysis may be performed and new generation priorities developed, with the change instantaneously mapped to all related vehicles 20*a* or 20*b*. Ultimately, maps and PPF patterns are selected by the installer/user and delivered to and utilized by the cutting tool. Thus, for each vehicle 20*a* and 20*b*, component lists can be maintained along with repositories of common and different parts, essentially allowing for the rapid configuration of a pattern for almost any vehicle 20*a* or 20*b* of a vehicle family 20. Thus, genealogies are developed for different vehicles 20*a* and 20*b* and families of vehicles 20. This mapping functionality is based in part on vehicle recognition, and finding year-over-year changes for the same make/model of a vehicle utilizing deep learning (DL), for example. Importantly, the mapping functionality allows user pattern modifications to be mapped to other and future associated patterns when desired, so that an installer does not have to repeat necessary edits.

An AI functionality and module may be used to provide the ML-based prioritization of pattern alerting and generation based on vehicle inventory analysis. It should be noted, as discussed in greater detail herein below, that the present disclosure contemplates the use of a conventional or novel 3-D scanning technologies for the generation of PPF patterns. When used, these next-generation enhancements transform the process of pattern development, realizing previously unattainable levels of speed and accuracy. Without ever having to touch the surface of a vehicle, these innovative 3-D scanning technologies employ lasers to capture the shape of any vehicle as flexible data that is quickly converted into a 2-D template. In one exemplary embodiment, the equipment is accurate within 7-8 microns in 3-D space. The data science process behind pattern generation includes mapping, pattern accuracy analysis, vehicle prioritization, vehicle comparison, 3-D data cleaning, 3-D to 2-D pattern validation, and current vehicle location end-pointing.

Figure 6:
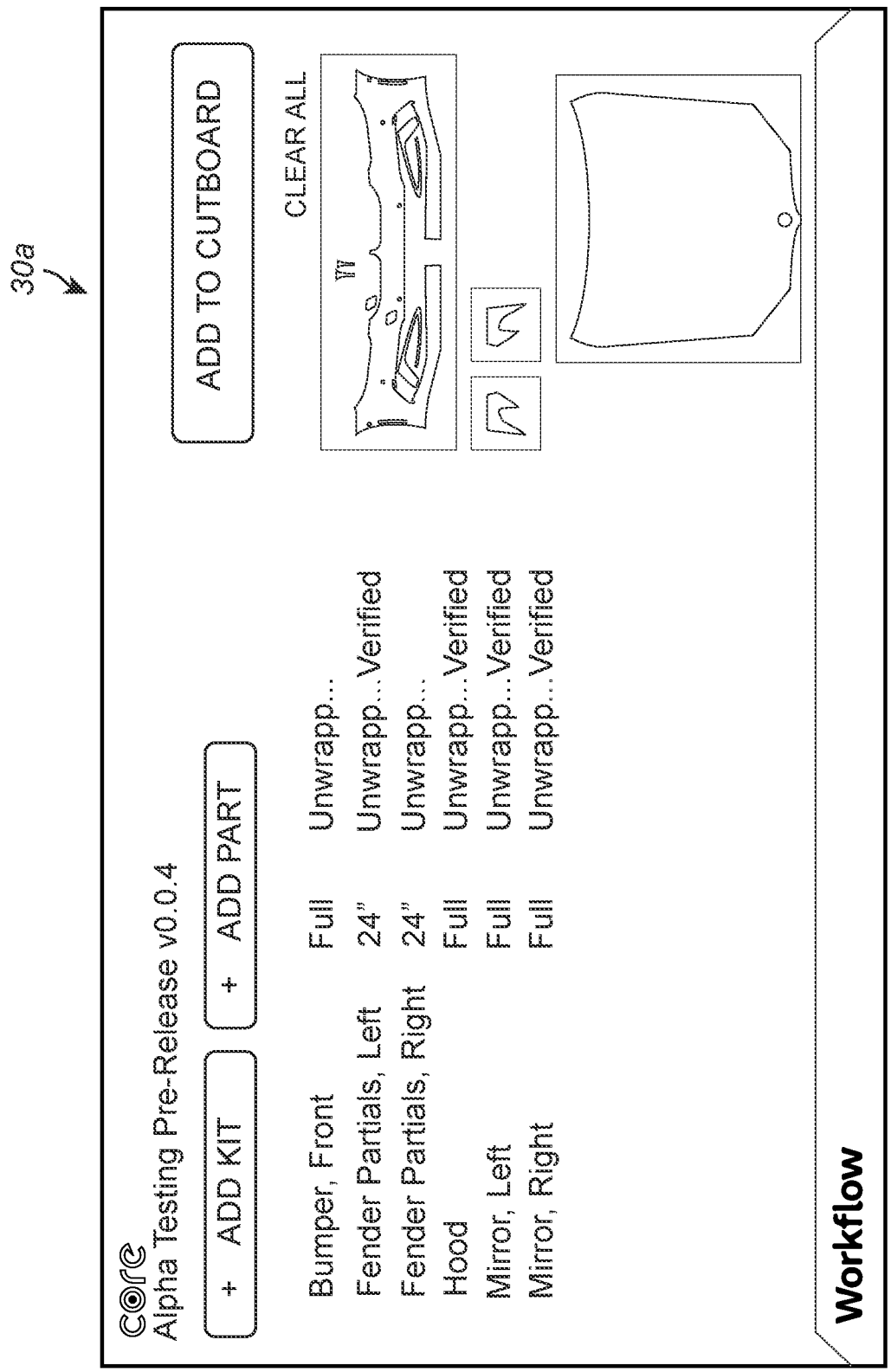
FIG. 6 is a part display screen utilized in accordance with the process of FIG. 1.
Figure 7:
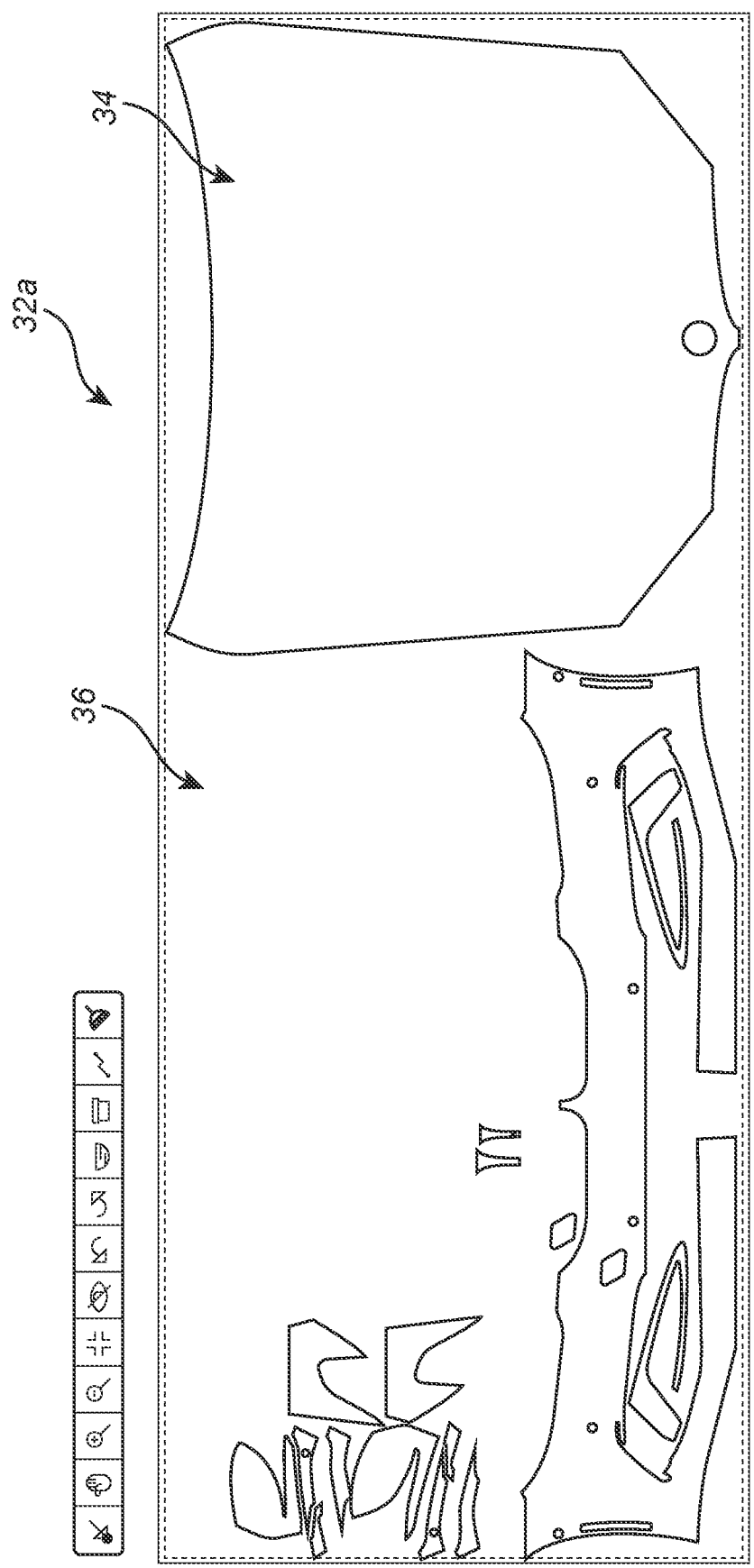
FIG. 7 is a cutboard display screen utilized in accordance with the process of FIG. 1.
Figure 8:
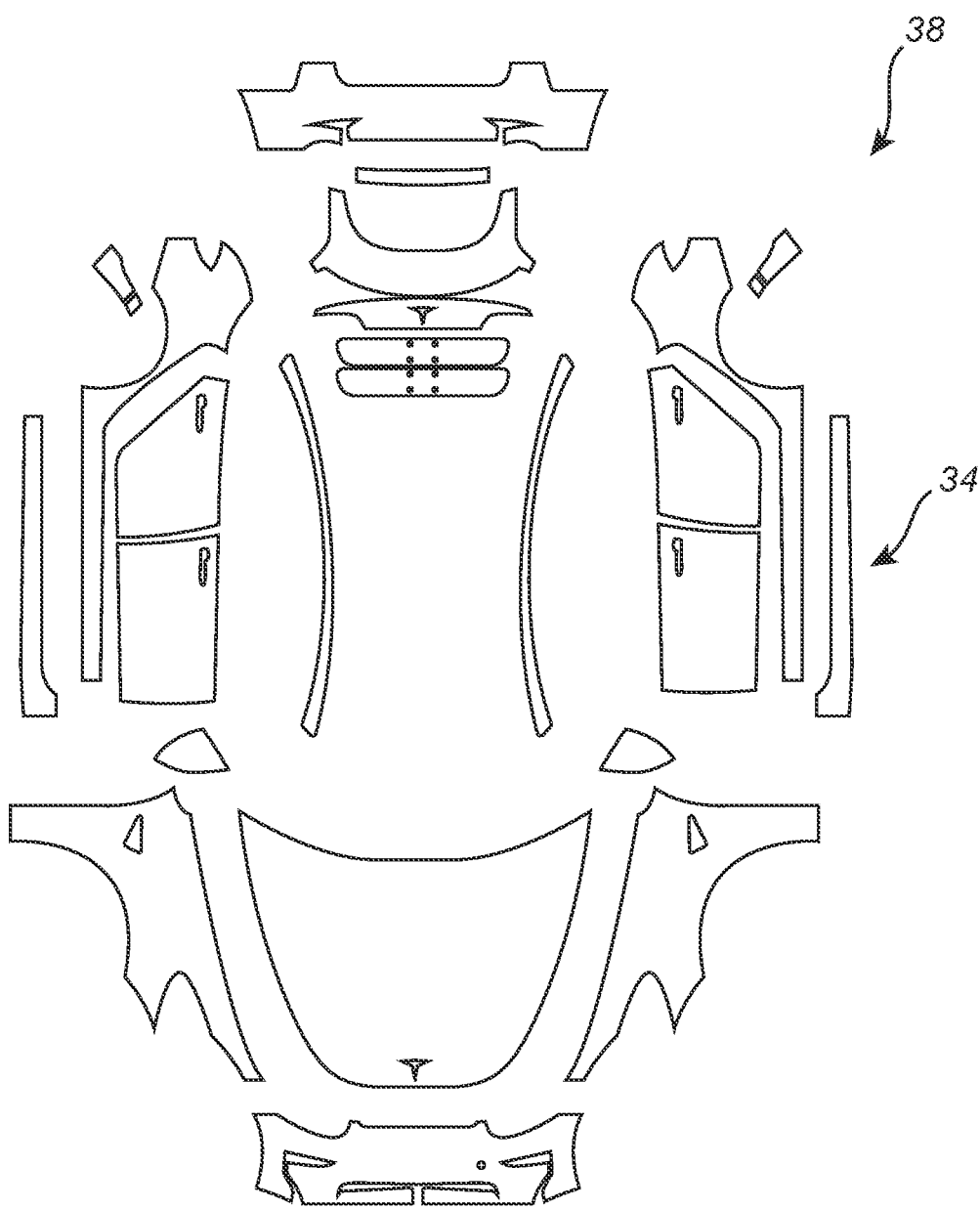
FIG. 8 is an exoskeleton display screen utilized in accordance with the process of FIG. 1, the exoskeleton view is generated from a multitude of individual part views.

FIG. 6 is a part display screen 30*a* utilized in accordance with the process 10 of FIG. 1. Here, a list of the various parts of a pattern are provided, and a representation of each part of the pattern are shown. If the contents of the pattern are acceptable to the installer/user, then a cutboard may be generated. FIG. 7 is a cutboard display screen 32*a* utilized in accordance with the process 10 of FIG. 1. Here, the various parts 34 are laid out on a representation of the film 36 from which they will ultimately be cut. On this cutboard display screen 32*a*, the parts 34 may be selected, moved, snapped to a grid, rotated, modified, nested manually or automatically to conserve film material during the cutting process, etc. Further, as is described in greater detail herein below, customized edge wrap may be added to the patterns, badge and sensor locations may be specified on the patterns, etc. FIG. 8 is an exoskeleton display screen 38 utilized in accordance with the process 10 of FIG. 1, the exoskeleton view is generated from a multitude of individual part views. This exoskeleton view 38 presents the various cover pieces in a commonsensical vehicle-corresponding layout, showing the relative position of each as laid out over the vehicle. Again, each cover piece is individually selectable, allowing further functionality subsequently. The exoskeleton view 38 allows for pattern selection, preferential arrangement, advanced visualization, pattern wrapping, pattern manipulation, pattern plotting and queuing, cutting diagnostics and dashboarding, profile settings and saving preferences, and links to help screens and videos, among other things, as do the other available views. The exoskeleton view 38 is dynamically generated for any given vehicle by identifying and placing, rotating, and/or spacing the pattern images associated with the vehicle, for example, as are the other available views.

Figure 9:
FIG. 9 is a cutting machine settings screen utilized in accordance with the process of FIG. 1.

FIG. 9 is a cutting machine settings screen 40*a* utilized in accordance with the process 10 of FIG. 1. Here, the work order identification may be provided, the cutting machine to which the cutting pattern on the cutboard may be selected, a film roll size may be specified, a padding after cut may be specified, and a cutting blade force may be specified. Once instructed, the cutting pattern on the cutboard is sent to the selected cutting machine and the component covers are cut from the film. Again, as is described in greater detail herein below, cutouts for sensors and badges and customized edge wrap may be turned on or off. Tack points may also be turned on or off, although this is primarily for display purposes and likely does not affect the actual cuts made. At various points in the process, the software application may provide helpful installer/user assistance, revert to work order information, and accept installer/user notes that may be stored for later reference. The cutting machine may also require password or other authorization through the software application.

Further, as a general matter, it should be noted that selection made on one screen are typically implemented across all screens. Thus, a part may be selected on one screen and then highlighted in other available views, for example. The cutting algorithm of the present disclosure may implement any conventional or novel cutting techniques. For example, the pattern generated via the software application of the present disclosure may include selected edge wrap, sensor cutouts, badge cutouts, and the like, and may account for areas where significant film stretching is expected upon installation. In certain thin pattern areas, based on past experience, significant installer force may be applied and it may be common for a film to stretch during application. In such areas, less pattern material may be provided to compensate for such stretching. Conversely, where extra stretching is expected to be needed, an appropriate amount of film may be provided. Thus, the pattern generated may be dynamic and adaptive and account for actual installer feedback, addressing needs and solving problems in advance.

Referring again to FIG. 1, after cutting, the software application or mobile device communicatively coupled to the software application is used to provide installer/user installation instructions, pattern notes source from past/other installations, instructional videos, and the like to aide the installer/user in installing the WF or PPF on a vehicle 50. For example, the various preferred tack points may be displayed and indicate a preferred tacking order, with preferred stretching areas noted, again with links to relevant notes, videos, etc. In another exemplary extension, the installer/user may be able to take a photo of the vehicle or a part thereof using the mobile device and then, in augmented reality (AR) space, the various parts of the pattern can be overlaid on the photo (or a representation) of the vehicle or part thereof, in the proper orientation, and again indicating sensor locations, badge locations, tack points, edge wrap positioning, etc. In this manner, the installer/user has a point-of-installation resource at his or her fingertips.

Figure 10:
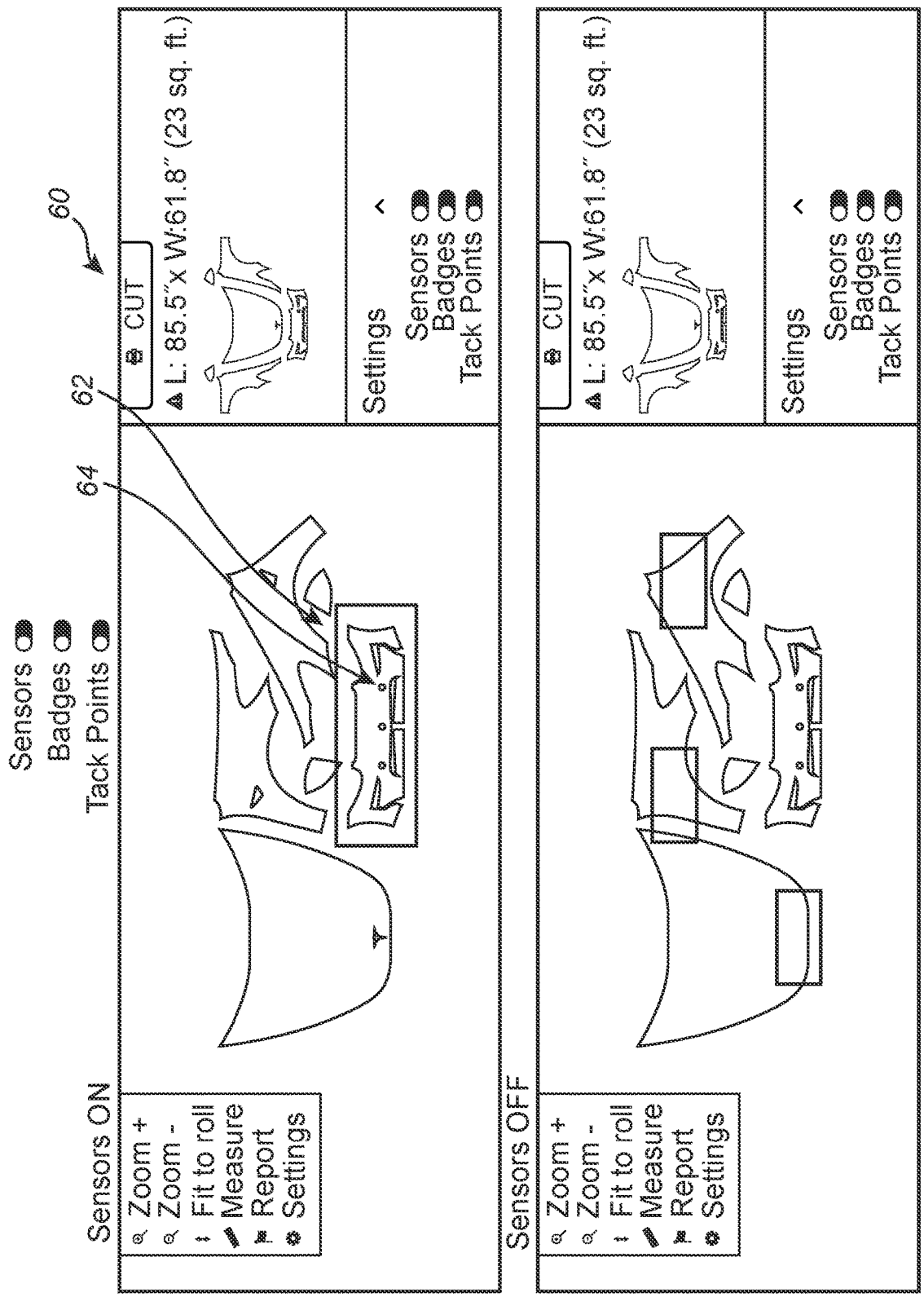
FIG. 10 is a schematic diagram illustrating the operational principles of one exemplary embodiment of the sensor view functionality of the software application of the present disclosure, highlighting the selection of sensor locations on a vehicle component via the software application and/or a mobile device for cutting/installation purposes.

FIG. 10 is a schematic diagram illustrating the operational principles of one exemplary embodiment of the sensor view 60 functionality of the software application of the present disclosure, highlighting the selection of sensor locations 64 on a vehicle component 62 via the software application and/or a mobile device for cutting/installation purposes. In general, cutout data is stored in such a way that the user interface knows which cutout corresponds to a particular part and cover piece and can easily toggle between cutouts or groupings of cutouts. The list of cutouts is built automatically based on the stored metadata and made available to the user interface. Such cutouts include sensors, badges, etc. For all such cutouts, line path naming conventions denote these items in the pattern SVGs so that the software application can recognize and interact with these paths.

Figure 11:
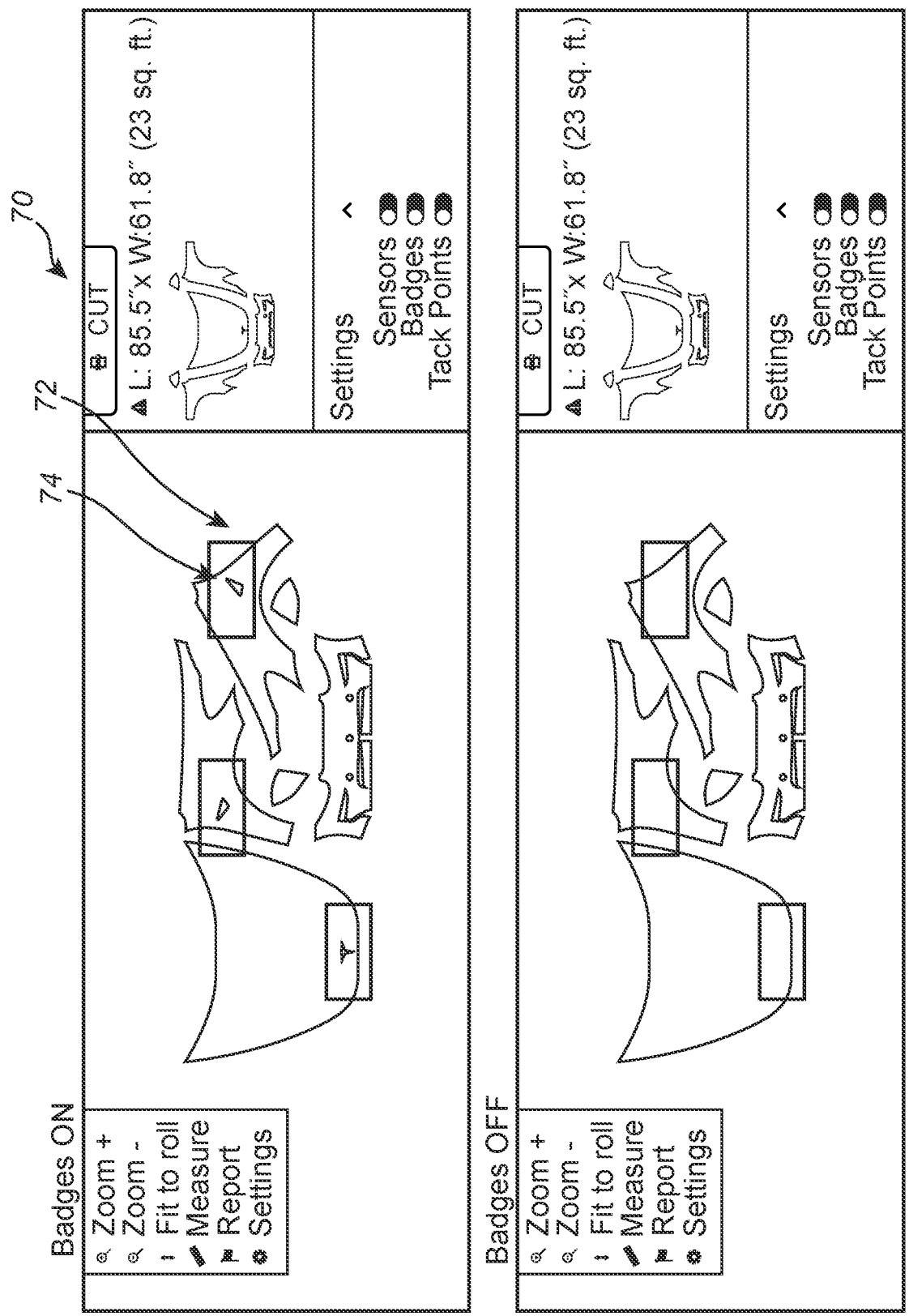
FIG. 11 is a schematic diagram illustrating the operational principles of one exemplary embodiment of the badge view functionality of the software application of the present disclosure, highlighting the selection of badge locations on a vehicle component via the software application and/or a mobile device for cutting/installation purposes.

FIG. 11 is a schematic diagram illustrating the operational principles of one exemplary embodiment of the badge view 70 functionality of the software application of the present disclosure, highlighting the selection of badge locations 74 on a vehicle component 72 via the software application and/or a mobile device for cutting/installation purposes. Again, in general, cutout data is stored in such a way that the user interface knows which cutout corresponds to a particular part and cover piece and can easily toggle between cutouts or groupings of cutouts. The list of cutouts is built automatically based on the stored metadata and made available to the user interface. Such cutouts include sensors, badges, etc.

Figure 12:
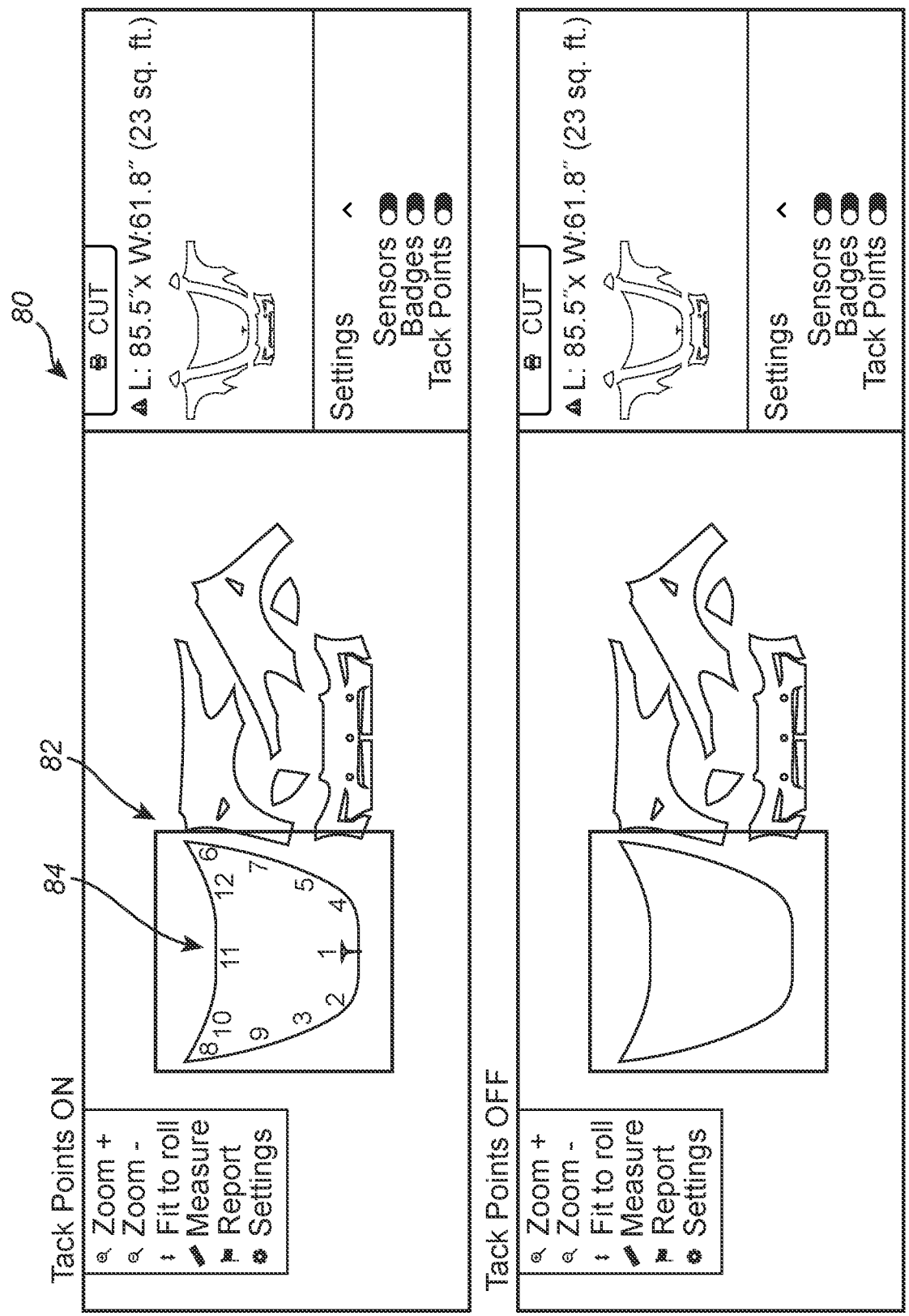
FIG. 12 is a schematic diagram illustrating the operational principles of one exemplary embodiment of the tack point view functionality of the software application of the present disclosure, highlighting the selection of tack point locations on a vehicle component via the software application and/or a mobile device for installation purposes.

FIG. 12 is a schematic diagram illustrating the operational principles of one exemplary embodiment of the tack point view 80 functionality of the software application of the present disclosure, highlighting the selection of tack point locations 84 on a vehicle component 82 via the software application and/or a mobile device for installation purposes. In general, tack point data is stored in such a way that the user interface knows which tack point corresponds to a particular part and cover piece and can easily toggle between tack points or groupings of tack points. The list of tack points is built automatically based on the stored metadata and made available to the user interface. Such tack points are preferably ordered. In general, tack points help guide the installer as to where to start applying a film to a component, e.g., to optimize fit and handling requirements, as the film must be tacked and stretched to fit them film. The tack points are thus displayed for easy reference and use by the installer, and numbered sequentially.

Figure 13:
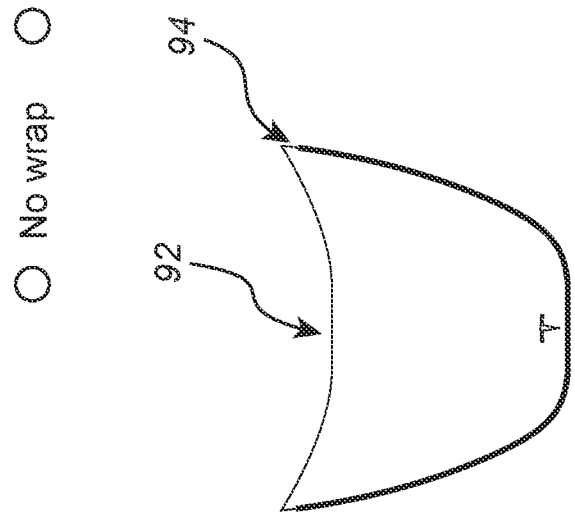
FIG. 13 is a schematic diagram illustrating the operational principles of one exemplary embodiment of the edge wrap view functionality of the software application of the present disclosure, highlighting the selection of edge wrap on a vehicle component via the software application and/or a mobile device for cutting/installation purposes.

FIG. 13 is a schematic diagram illustrating the operational principles of one exemplary embodiment of the edge wrap view 90 functionality of the software application of the present disclosure, highlighting the selection of edge wrap 94 on a vehicle component 92 via the software application and/or a mobile device for cutting/installation purposes. Pattern edges that are typically wrapped are stored in pattern metadata and made available to the user interface. The user can thus select an edge and extend the pattern along that edge, automatically creating a desired edge wrap that, when installed, looks and performs as if it was custom created by hand. Further, the user can switch on and off the ability to make and save handmade wraps.

Figure 14:
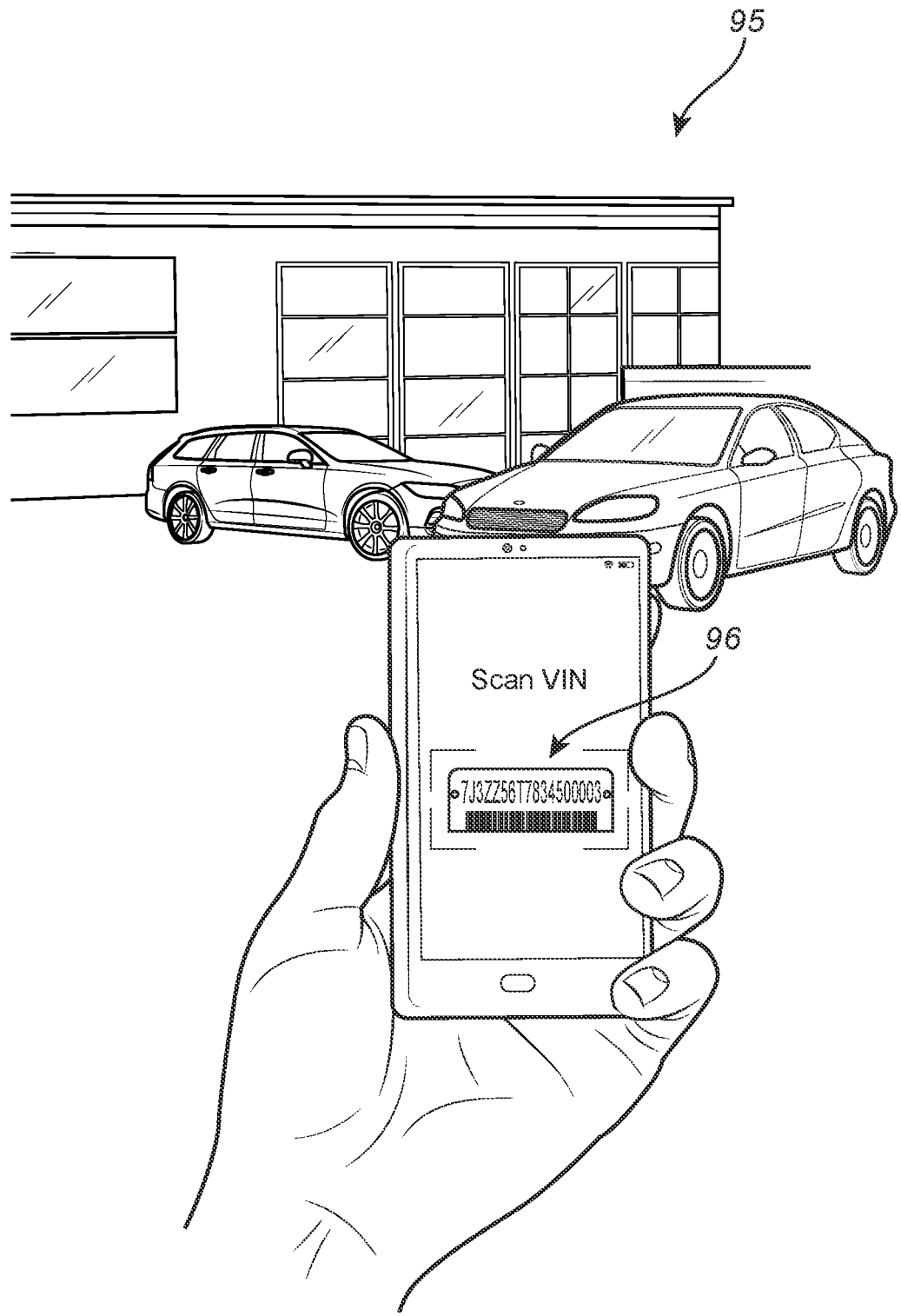
FIG. 14 is a schematic diagram illustrating one exemplary embodiment of the mobile device verification of the software application of the present disclosure.

FIG. 14 is a schematic diagram illustrating one exemplary embodiment of the mobile device verification of the software application of the present disclosure. Specifically, the scanning of a VIN 96 is illustrated using the mobile device 95 that is operable linked to or itself executes the software application.

Figure 15:
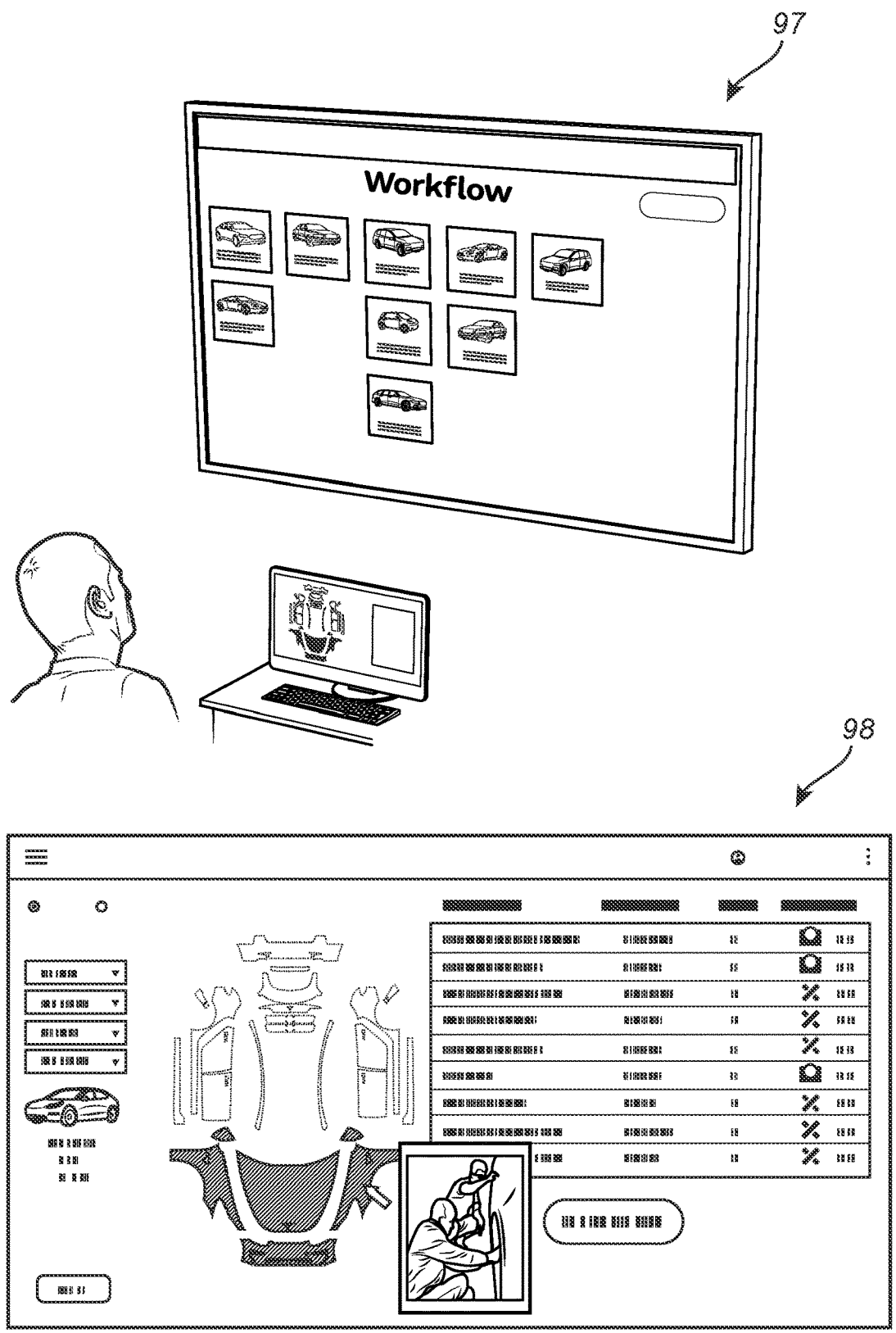
FIG. 15 is a schematic diagram illustrating one exemplary embodiment of the and networked status tracking functionality and the crowd-sourced help functionality of the software application of the present disclosure.

FIG. 15 is a schematic diagram illustrating one exemplary embodiment of the and networked status tracking functionality and the crowd-sourced help functionality of the software application of the present disclosure.

In general, the mobile device 95 (FIG. 14) is linked to the software application functionality via the scanning of the VIN 96, for example. This allows the various exoskeleton views and installation guides from the software application to be viewed by the user-installer proximate the vehicle. This same VIN enablement can allow the status of a given cutting/installation job to be tracked and posted to a centralized display 97 (FIG. 15) or monitored by another mobile device, such that workflow can be tracked and customers can stay informed of job progress. Progress logging via mobile device can be used to gather and analyze job performance metrics and the like. Importantly, the mobile application includes a dealer dashboard 98 (FIG. 15) and allows for VIN scanning, photo check-in, workflow management, and feedback input. The mobile application also includes a pattern check, a present cut view, the exoskeleton view, a tack point view, virtual tech services, and access to tutorials. Standard features includes a user profile, chat support, and social media posting. The pattern check checks the availability of a given pattern and provides any tagged user comments intended for future reference. Real-time progress snapshots can also be taken for shared display and progress tracking.

It should be noted that the software architecture of the present disclosure enables many conventional functionalities, such as real-time virtual support and feedback and the like, as well as marketing via social media and the like. Further, real-time and scheduled updates can be pushed. The software architecture distances the software application from a dependence on a conventional computer-aided drawing (CAD) platform and allows for more robust server and cloud-based operation. Part-specific helps tips and videos may be provided that are available upon rollover of the individual pattern piece within the exoskeleton view, as received from various stored and Internet-based sources.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 16:
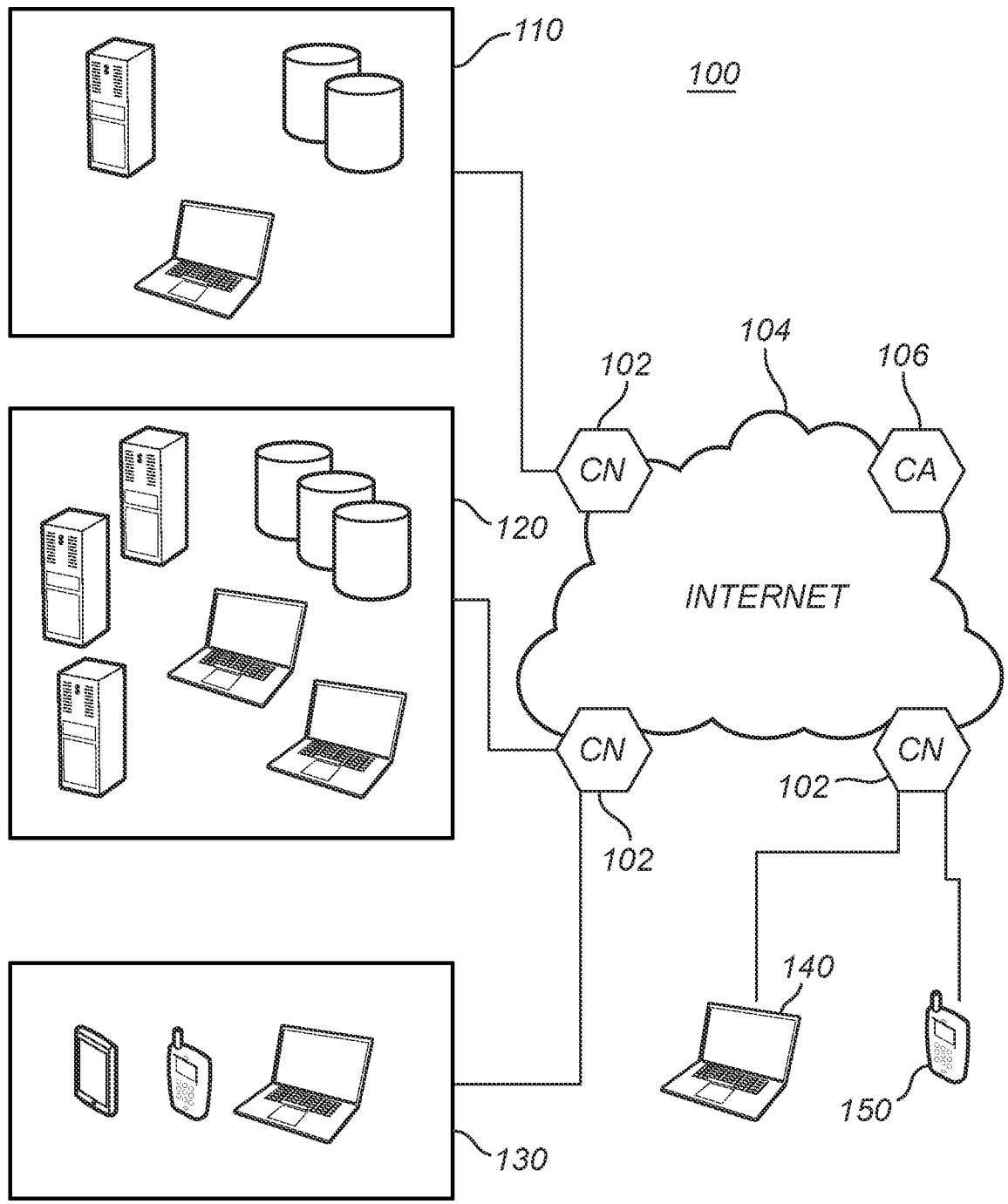
FIG. 16 is a network diagram of a cloud-based system for implementing various cloud-based services of the present disclosure.
Figure 17:
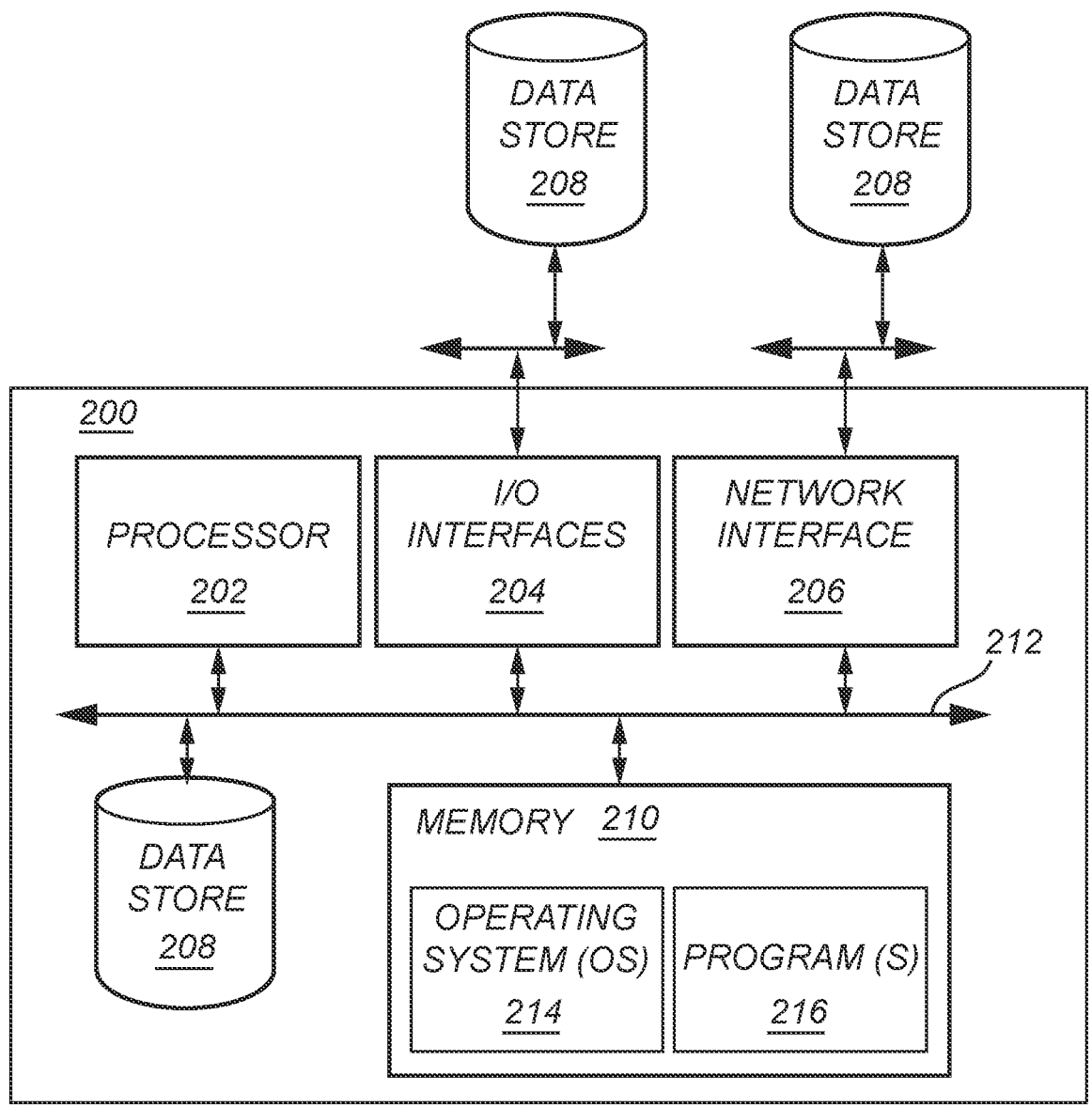

FIG. 16 is a network diagram of a cloud-based system 100 for implementing various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 17) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT)

deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application necessarily required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 17 is a block diagram of a server 200, which may be used in the cloud-based system 100 (FIG. 16), in other systems, or standalone. For example, the CNs 102 (FIG. 16) and the central authority nodes 106 (FIG. 16) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 17 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 16). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 514 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 18:
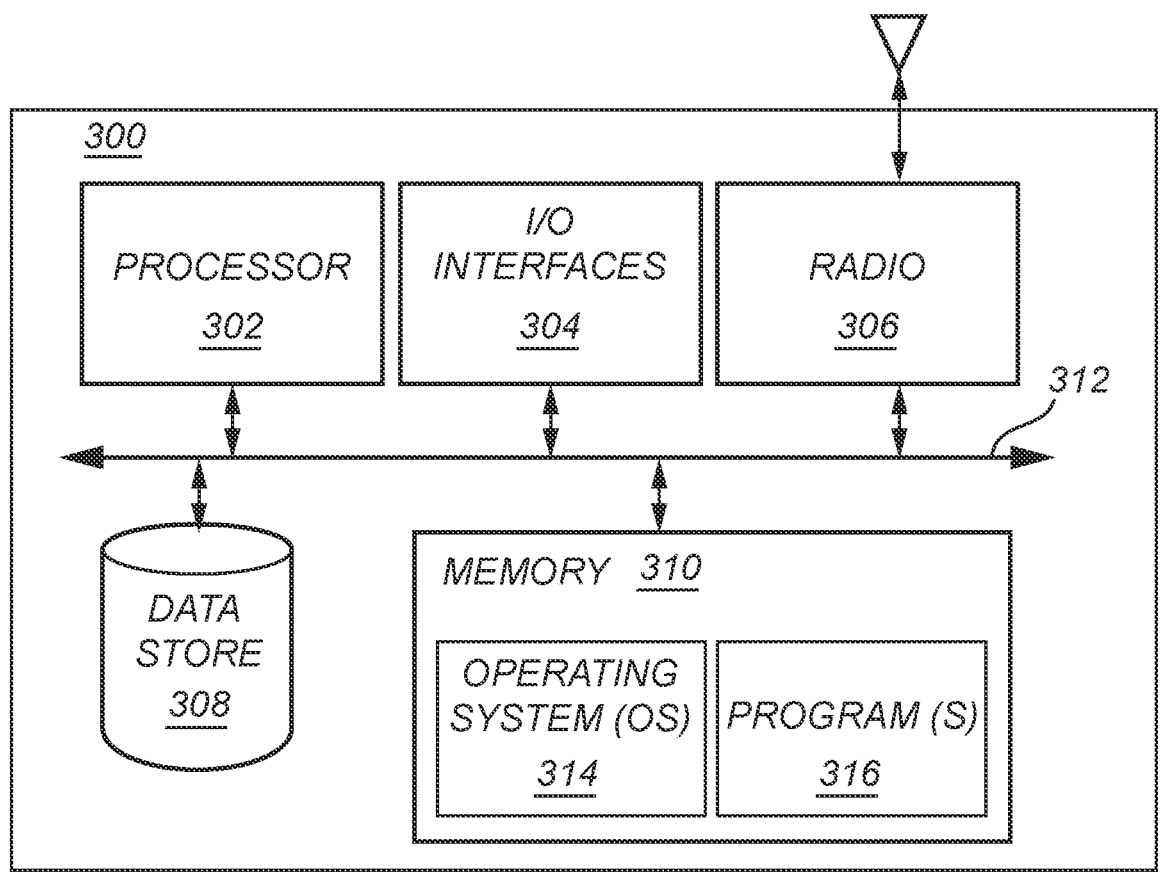

FIG. 18 is a block diagram of a user device 300, which may be used in the cloud-based system 100 (FIG. 16) or the like. Again, the user device 300 can be a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 18 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 18, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100 (FIG. 16).

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method for assembling a pattern and cutting and applying a film to a vehicle, the method comprising:

receiving a vehicle identification and obtaining the pattern associated with the received vehicle identification using pattern assembly instructions stored in a memory and executed by a processor;

modifying the pattern using pattern modification instructions stored in the memory and executed by the processor;

transmitting the pattern to a cutting machine, wherein the cutting machine is operable for cutting the film according to the pattern; and transmitting installation instructions associated with the pattern to a mobile device that is adapted to be utilized by an installer/user and display the installation instructions proximate the vehicle, wherein, when executed by the processor, the pattern assembly instructions are operable for correlating common pattern parts between vehicles predetermined to be in a common vehicle family, and wherein the pattern assembly instructions are operable for incorporating into the pattern a prior installer/user edit to an associated and mapped pattern.

2. The method of claim 1, wherein receiving the vehicle identification comprises one of selecting the vehicle from a vehicle database and scanning a vehicle identification number of the vehicle using the mobile device.

3. The method of claim 1, further comprising mapping a pattern modification to other or future associated patterns.

4. The method of claim 1, wherein, when executed by the processor, the pattern modification instructions are operable for:
  incorporating into the pattern a prior installer/user edit to an associated and mapped pattern;
  reconfiguring a relative position of a part of the pattern;
  modifying a size of a part of the pattern based on a predetermined dimensional change in film associated with the part of the pattern during installation;
  adding or removing one or more predetermined sensor cutouts to or from a part of the pattern;
  adding or removing one or more predetermined badge cutouts to or from a part of the pattern; and
  adding or removing one or more edge wrap extensions to or from a part of the pattern based on an indication of installer/user preferences.

5. The method of claim 1, wherein the installation instructions displayed on the mobile device comprise one or more tack points to be used by the installer/user when installing parts cut from the film according to the pattern are installed on the vehicle.

6. The method of claim 1, wherein the installation instructions displayed on the mobile device comprise notes associated with one or more prior installations associated with the pattern.

7. The method of claim 1, wherein the installation instructions displayed on the mobile device comprise one or more videos associated with the pattern.

8. The method of claim 1, wherein the mobile device is operable for capturing an image of the vehicle over which the pattern is displayed in an augmented reality space.

9. A non-transitory computer-readable medium stored as instructions in a memory and executed by a processor to perform steps for assembling a pattern and cutting and applying a film to a vehicle, the steps comprising:
  receiving a vehicle identification and obtaining the pattern associated with the received vehicle identification using pattern assembly instructions stored in the memory and executed by the processor;
  modifying the pattern using pattern modification instructions stored in the memory and executed by the processor;
  transmitting the pattern to a cutting machine, wherein the cutting machine is operable for cutting the film according to the pattern; and
  transmitting installation instructions associated with the pattern to a mobile device that is adapted to be utilized by an installer/user and display the installation instructions proximate the vehicle,
  wherein, when executed by the processor, the pattern assembly instructions are operable for correlating common pattern parts between vehicles predetermined to be in a common vehicle family, and
  wherein the pattern assembly instructions are operable for incorporating into the pattern a prior installer/user edit to an associated and mapped pattern.

10. The non-transitory computer-readable medium of claim 9, wherein receiving the vehicle identification comprises one of selecting the vehicle from a vehicle database and scanning a vehicle identification number of the vehicle using the mobile device.

11. The non-transitory computer-readable medium of claim 9, wherein, when executed by the processor, is operable for mapping a pattern modification to other or future associated patterns.

12. The non-transitory computer-readable medium of claim 9, wherein, when executed by the processor, the pattern modification instructions are operable:
  incorporating into the pattern a prior installer/user edit to an associated and mapped pattern;
  reconfiguring a relative position of a part of the pattern;
  modifying a size of a part of the pattern based on a predetermined dimensional change in film associated with the part of the pattern during installation;
  adding or removing one or more predetermined sensor cutouts to or from a part of the pattern;
  adding or removing one or more predetermined badge cutouts to or from a part of the pattern; and
  adding or removing one or more edge wrap extensions to or from a part of the pattern based on an indication of installer/user preferences.

13. The non-transitory computer-readable medium of claim 9, wherein the installation instructions displayed on the mobile device comprise one or more tack points to be used by the installer/user when installing parts cut from the film according to the pattern are installed on the vehicle.

14. The non-transitory computer-readable medium of claim 9, wherein the installation instructions displayed on the mobile device comprise notes associated with one or more prior installations associated with the pattern.

15. The non-transitory computer-readable medium of claim 9, wherein the installation instructions displayed on the mobile device comprise one or more videos associated with the pattern.

16. The non-transitory computer-readable medium of claim 9, wherein the mobile device is operable for capturing an image of the vehicle over which the pattern is displayed in an augmented reality space.

17. A system for assembling a pattern and cutting and applying a film to a vehicle, the system comprising:
  a memory storing pattern assembly instructions executed by a processor to receive a vehicle identification and obtain the pattern associated with the received vehicle identification;
  the memory storing pattern modification instructions executed by the processor to modify the pattern;

the memory storing pattern cutting instructions executed by the processor to transmit the pattern to a cutting machine, wherein the cutting machine is operable for cutting the film according to the pattern; and the memory storing installation instructions executed by the processor to transmit installer/user instructions associated with the pattern to a mobile device that is adapted to be utilized by an installer/user and display the installer/user instructions proximate the vehicle, wherein, when executed by the processor, the pattern modification instructions are operable for incorporating into the pattern a prior installer/user edit to an associated and mapped pattern.

18. The system of claim 17, wherein, when executed by the processor, the pattern modification instructions are operable for:

incorporating into the pattern a prior installer/user edit to an associated and mapped pattern;

reconfiguring a relative position of a part of the pattern;

modifying a size of a part of the pattern based on a predetermined dimensional change in film associated with the part of the pattern during installation;

adding or removing one or more predetermined sensor cutouts to or from a part of the pattern;

adding or removing one or more predetermined badge cutouts to or from a part of the pattern; and adding or removing one or more edge wrap extensions to or from a part of the pattern based on an indication of installer/user preferences.

19. The system of claim 17, wherein the installer/user instructions displayed on the mobile device comprise one or more tack points to be used by the installer/user when installing parts cut from the film according to the pattern are installed on the vehicle.

* * * * *